United States Patent [19]

Schmid et al.

[11] Patent Number: 5,065,953
[45] Date of Patent: Nov. 19, 1991

[54] SAFETY BELT RETRACTOR

[75] Inventors: Johannes Schmid, Schwäbisch Gmünd-Hussenhofen; Thomas Kielwein, Leinzell, both of Fed. Rep. of Germany

[73] Assignee: TRW Repa GmbH, Alfdorf, Fed. Rep. of Germany

[21] Appl. No.: 522,994

[22] Filed: May 14, 1990

[30] Foreign Application Priority Data

Jun. 10, 1989 [EP] European Pat. Off. ............ 89110507

[51] Int. Cl.⁵ .............................................. B65H 75/28
[52] U.S. Cl. ..................................................... 242/74
[58] Field of Search ......... 242/74, 74.1, 107, 107.4 R, 242/107.4 E

[56] References Cited

U.S. PATENT DOCUMENTS

| 2,177,786 | 10/1939 | Roemig | 242/74.1 |
| 3,202,379 | 8/1965 | Wrighton et al. | 242/74 X |
| 3,369,767 | 2/1968 | Greenfield | 242/74 |
| 3,432,115 | 3/1969 | Stoffel et al. | 242/74 X |
| 3,802,641 | 4/1974 | Saito | 242/74 |
| 4,119,281 | 10/1978 | Paitula et al. | 242/74 X |
| 4,385,736 | 5/1983 | Yamamoto | 242/74 X |
| 4,967,976 | 11/1990 | Kawai | 242/74 |

FOREIGN PATENT DOCUMENTS

| 1278336 | 9/1968 | Fed. Rep. of Germany | 242/74 |
| 2556409 | 6/1977 | Fed. Rep. of Germany . | |

Primary Examiner—John M. Jillions
Attorney, Agent, or Firm—Tarolli, Sundheim & Covell

[57] ABSTRACT

The shaft of a safety belt retractor is separated into two stays by an axial slot. One of the stays is provided with an axial groove in which the end of the belt webbing is inserted. Thereafter, the belt webbing is led around the one stay to have two windings, the end of the two windings being held in the axial slot. Finally, the rest of the belt webbing is wound around both stays.

Neither seams nor special parts are needed for safely securing the belt webbing on the shaft.

3 Claims, 1 Drawing Sheet

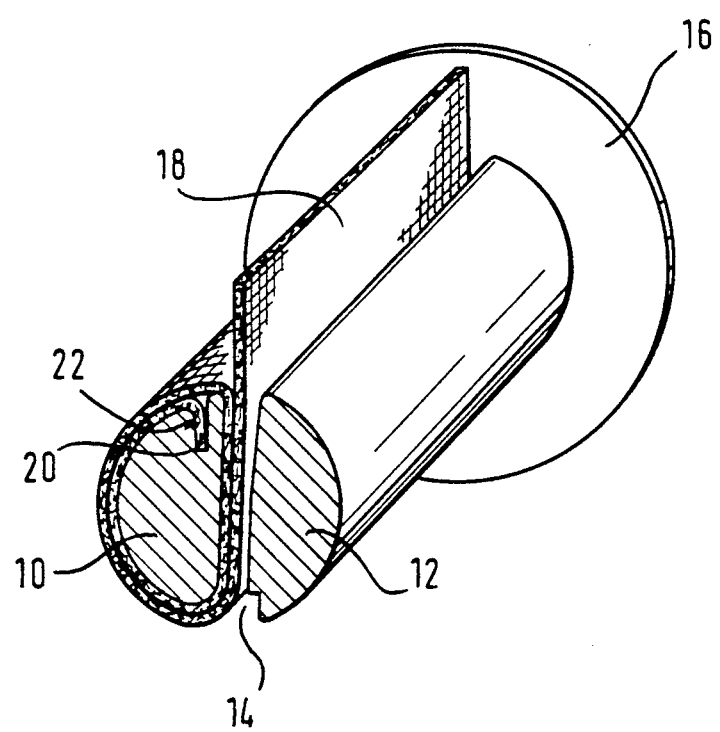

SAFETY BELT RETRACTOR

FIELD OF THE INVENTION

The present invention relates to an arrangement for securing a safety belt webbing on a shaft of a safety belt retractor, the shaft comprising an axial slot through which the belt webbing is led.

BACKGROUND OF THE INVENTION

An arrangement of this kind has been known from DE-AS 25 56 409, for instance. In contrast to conventional belt webbing securing devices, no seam is necessary for securing the belt webbing to be sufficiently safe in such an arrangement. However, it has to be accepted that the end of the belt webbing has to be fixed in the axial slot of the shaft by means of a clamp having a U-shaped cross-section.

It is the object underlying the invention to create an arrangement for securing a safety belt webbing on a shaft of a safety belt retractor wherein both a belt webbing seam as well as additional parts such as clamps, clamping devices or the like become superfluous.

SUMMARY OF THE INVENTION

This object is met in accordance with the invention in the arrangement of the kind specified above by the improvement wherein an axial groove is provided at the outer periphery of one of said first and second stays, the end of said belt webbing is inserted into said groove, the portion of the belt webbing adjacent its end is laid around said one stay to have at least two windings, and the rest of the belt webbing is wound onto the shaft formed by the two stays.

The end of the belt webbing is thus held in the groove of the one stay with moderate force only in the arrangement according to the invention. As the belt webbing is laid around said one stay to have at least two windings, additional loop friction occurs to reinforce the retaining force with which the end of the belt webbing is held in the groove according to an exponential law which is entered by the loop angle as an exponent. Two windings only attain a holding force which satisfies the usual test conditions. It is not possible to unwind the windings from the one stay as the belt webbing must again be led through the axial slot between the two stays for completing the two or more windings on the one stay and as the end of the windings surrounding the stay is consequently held in the axial slot.

In order to ensure a uniform winding structure, the one stay around which the belt webbing is laid to have at least two windings has an outer diameter being reduced over the other shaft stay by such an amount that the outer diameter of the one stay surrounded by at least two belt webbing windings is approximately equal to the outer diameter of the other stay. In other words, the outer periphery of the one stay has a diameter less than the diameter of the outer periphery of the other stay by an amount corresponding substantially to the thickness of the at least two windings of the belt webbing.

Further, according to one preferred embodiment, the groove into which the end of the belt webbing is inserted extends advantageously in parallel with respect to the axial slot. Thus, two almost complete windings may be realized by means of laying the belt webbing twice around the one stay.

Moreover, the end of the belt webbing is pressed into the groove, which is facilitated by a groove design having a low angle V-shaped cross-section.

BRIEF DESCRIPTION OF THE DRAWING

Upon reference to the drawing, one preferred embodiment of the invention will now be described in detail. The single FIGURE in the drawing shows a schematic representation being partly reproduced sectionally of the shaft of a safety belt retractor together with the end of the belt webbing being secured to it.

DETAILED DESCRIPTION OF THE INVENTION

The two stays 10, 12 of the shaft of a belt retractor are separated from each other by an axial through-type slot 14. Two flanges, of which only one flange 16 is illustrated, are respectively situated on both ends of the shaft. A belt webbing 18 extends through the axial slot 14 and is laid around stay 10 to have two windings or more than two, if necessary. The end of the belt webbing denoted by 20 is inserted in an axial groove 22 of stay 10. The axial groove 20 extends in parallel with respect to the axial slot 14 and is designed to have a low angle V-shaped cross-section so that the end of the belt webbing may be pressed into the groove. The outer diameter of the stay 10 is slightly smaller than the one of the stay 12 in order to take into account the two or more belt webbing layers so that stay 10 together with the two or more belt webbing layers and stay 12 have approximately the same outer diameter. As may easily be seen from the drawing, no further special parts are needed for securing the belt webbing on the shaft, which not only reduces expenditure in constructional parts, but also facilitates assembly.

We claim:

1. In a safety belt retractor comprising a shaft for winding a safety belt webbing, said shaft having an axial slot through which an end portion of the belt webbing is led, and said slot separating the shaft into first and second stays having outer peripheries jointly defining the outer periphery of said shafts, the improvement wherein:
   an axial groove is provided at the outer periphery of said first stay,
   the end of the belt webbing is inserted into said axial groove,
   the portion of the belt webbing adjacent its end is wound at least twice around said first stay to have at least two windings thereon,
   the remainder of the belt webbing is wound onto said shaft formed by said first and second stays, and
   said outer periphery of said first stay has a diameter which is less than the diameter of the outer periphery of said second stay by an amount corresponding substantially to the thickness of said at least two windings of the belt webbing on said first stay.

2. The improvement of claim 1, wherein said groove extends parallel to said axial slot.

3. The improvement of claim 1, wherein said groove has a low angle V-shaped cross section and the end of the belt webbing is pressed thereinto.

* * * * *